July 19, 1938.  R. J. GUBA  2,123,893

WIRE FABRIC

Filed Dec. 10, 1935

Inventor
Raymond J. Guba
by Murray C. Boyer
Atty.

Patented July 19, 1938

2,123,893

UNITED STATES PATENT OFFICE 2,123,893

WIRE FABRIC

Raymond J. Guba, Philadelphia, Pa., assignor to Audubon Wire Cloth Corporation, Philadelphia, Pa., a corporation of New Jersey Application December 10, 1935, Serial No. 53,694

5 Claims. (Cl. 198—196)

My invention relates to the manufacture of flexible belts of the type made up of a series of helically coiled wires in interlocked or interlaced relation, and with their ends connected to prevent lateral displacement. These belts are usually made up of wires coiled in one direction, and to avoid shifting on the driving pulleys, a complete belt is usually made of sections having wires coiled in opposite direction—one section being of right-hand weave and an adjacent section of left-hand weave, and so on throughout the length of the belt—the sections being joined by suitable connectors. In other forms of these wire belts, the coiled wires do not interlock but are connected by straight bars and, in such arrangement, wires of right-hand twist may alternate with wires of left-hand twist so that, when passing over the driving pulleys, there is no tendency of the belt to creep laterally.

In all instances, these belts present on their upper or ware-carrying surface a multiplicity of helices extending diagonally with respect to the longitudinal and cross-axes of the belt, and this surface, while perhaps sufficiently smooth for relatively large objects borne upon the same, is, nevertheless, too uneven when the objects carried are of small size—small cans, for instance, when the belts are employed in processing chambers, or small bottles, vials, or the like, when employed in glass annealing leers and the like. Furthermore, these belts are frequently employed with means for transferring the articles borne thereby to other belts traveling in opposite directions, under conditions making it desirable to prolong the heat or other treatment within a limited space; such transferring devices usually comprising blades or other diverting members angularly disposed with respect to the belts so as to sweep off the articles borne upon the same.

The object of my invention is to provide the helically coiled wires making up these belts with superposed members, usually lying in a single plane, which provide a relatively smooth surface throughout the length and breadth of such belt. To this end, I may attach to the helices of the belt wires, as by spot welding or the like, crosswires or other members which may be straight and extend the full length of the coiled wires. The attached members are preferably in the form of relatively narrow, flat, plate-like sections, perforate or imperforate, as may be desired, and they may be in abutting relationship in the straight runs of the belt, or they may slightly overlap longitudinally of the belt to provide a continuous surface well adapted to retain loose or finely divided material. In forms of conveyor belts designed to have diagonally disposed runs, the attached members may have flanged or other portions extending some distance above the normal plane of the belt to form flights for positive lifting engagement with articles borne thereby. It is also within the scope of my invention to turn up the ends of the attached members, flat plates and the like, to form guards or retaining edges for the belt.

In addition to providing a smooth surface, these applied members, plate sections and the like, placed lengthwise of the helically coiled wires inhibit stretch of the same so that a belt made of coiled wires with the attached elements connected to the helices of the same by welding or otherwise, is entirely rigid in a transverse direction.

Under usual conditions, the attached members, plate sections and the like, may be of a thickness equalling that of the helically coiled wires making up the belt and to which they are attached, although they may be of heavier or lighter metal. It will be understood of course, that various metals may be employed for the belt wires and for the attached members, plate sections, and the like.

These and other features of my invention are more fully set forth hereinafter; reference being had to the accompanying drawing, more or less diagrammatic in character, in which.

Figure 1:
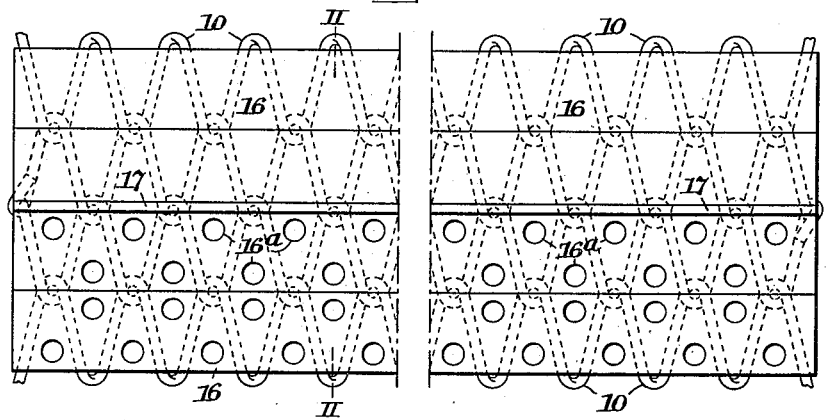
Figure 1 is a plan view of a portion of belt structure within the scope of my invention; illustrating the application of plate-like sections to the helices for the purpose of providing a belt with a continuous ware-carrying surface.

In the drawing, the helically coiled wires of the belt shown in the several views are indicated at 10, and the attached members—in this instance, in the form of plate sections, indicated at 16— are laid upon the surface of the helices of the respective belt wires and welded or otherwise permanently secured thereto at the points a. The attached members, plate sections and/or the like, indicated at 16, may extend the full length of the belt wires, or they may extend beyond the same and, in some instances, they may be less in length than the belt wires. Fig. 2 is a sectional view of the belt on the line II—II, Fig. 1.

Figure 2:
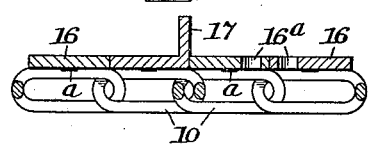
Fig. 2 is a sectional view on the line II—II, Fig. 1.

In Figs. 1 and 2, I have shown a section of a belt made up of helically coiled wires, of right or left hand twist as the case may be, to which have been applied plate-like elements 16 which may be in substantial engagement with each other in the horizontal runs of the belt. These plate-like sections may be imperforate, as indicated in one portion of said views, or they may be provided with apertures 16ª, as indicated in another portion of said views, such apertures serving the dual purpose of lightening the belt and permitting circulation of heat when employed in operations such as the processing of canned products, or the annealing of glassware, etc. The attached members, plate sections and/or the like, are laid upon the surfaces of the helices of the respective belt wires and welded or otherwise permanently secured thereto at the points a.

In many belts now employed in glass annealing leers, effort has been made to increase the smoothness by using closely woven wires having relatively short helices, with a view of maintaining an approximately level ware-carrying surface. In my improved construction, more particularly the type of belt illustrated in Figs. 1 and 2 wherein flat plate-like elements are carried by the helically coiled wires, I may employ belt wires having helices of considerable length and of the same weight of metal heretofore employed with short helices, and thereby not only lighten the belt but secure a perfectly level ware-carrying surface.

In all instances, the applied members provide a ware-carrying surface that is substantially level in the straight runs of the belt. If desired, certain of the plate sections of the type indicated in Figs. 1, 2 and 3, may include flanges 17, which may be at right angles thereto, for the purpose of providing article-carrying flights when belts of this type are used as conveyors which include diagonal runs. In the construction illustrated in Figs. 1 and 2, a flange is shown as disposed at the edge of a plate section; the latter with the flange being substantially L-shape in cross-section. In the form illustrated in Fig. 4, the flange indicated at 17ª is shown as disposed intermediate the edges of a plate section; presenting an inverted T-shape in cross section.

Figure 3:
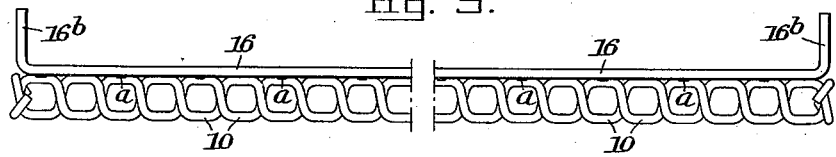
Fig. 3 is a transverse section of a belt of the type illustrated in Figs. 1 and 2, showing the plate-like connectors attached to the belt wires provided with end flanges.
Figure 4:
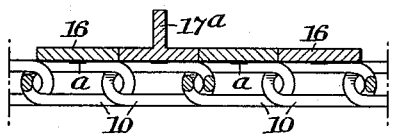
Fig. 4 is a sectional view similar to Fig. 2, illustrating a slightly modified construction within the scope of my invention.
Figure 5:
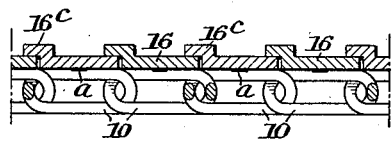
Fig. 5 is a cross sectional view similar to Fig. 2, showing plate-like connectors attached to the belt wires with one edge in overlapped position.

It is within the scope of my invention to turn up the ends of the attached members to form guards or retaining edges, an effect that may be produced in the type of belt illustrated in Figs. 1 and 2 by turning up the ends of the plate-like elements substantially at right angles thereto, as illustrated at 16ᵇ in Fig. 3. In addition, the plate-like sections may overlap as illustrated at 16ᶜ in Fig. 5; such form of belt being particularly desirable when it is employed for the conveyance of loose or finely divided material that would otherwise tend to sift through the surface provided by plate-like sections.

When the belt wires are interlocked or interlaced with each other in the formation of a belt of the type illustrated, the superposed and attached members, plate sections and/or the like, may be applied after the belt is formed.

Various modifications may be made in the foregoing embodiments of my invention without departing from the spirit and scope thereof as set forth in the appended claims.

I claim:

1. A belt comprising a plurality of helically coiled wires in interlocking relation extending throughout the length of the belt, and a continuous platform of plate sections covering said helically coiled wires throughout the length of the belt; each of said coiled wires carrying a plate section.

2. A belt comprising a plurality of helically coiled wires in interlocking relation extending throughout the length of the belt, and a continuous platform of perforated plate sections covering said helically coiled wires throughout the length of the belt; each of said coiled wires carrying a perforated plate section.

3. A belt comprising a plurality of helically coiled wires in interlocking relation throughout the length of the belt, and a continuous platform of plate sections covering said helically coiled wires throughout the length of the belt; each of said coiled wires carrying a plate section and certain of said plate sections being flanged providing partitions between sections of the platform.

4. A belt comprising a plurality of helically coiled wires in interlocking relation throughout the extent of the same, and a continuous platform in a smooth and substantially single plane covering said helically coiled wires throughout the length of the belt; said platform being made up of flat plate sections and each of said belt wires carrying a plate section.

5. A belt comprising a plurality of helically coiled wires in interlocking relation throughout the extent of the same, and a continuous platform of plate sections covering said helically coiled wires throughout the length of the belt; each of said wires carrying a plate section and each of said plate sections having an end flange at the marginal edge of the belt.

RAYMOND J. GUBA.